Nov. 26, 1968     C. FELDMAN ET AL     3,412,575
JEWELRY ARTICLE INCLUDING THIN METAL AND DIELECTRIC FILMS
Filed Jan. 18, 1966
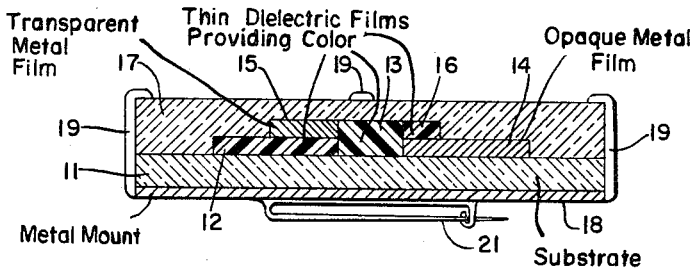
FIG.1.
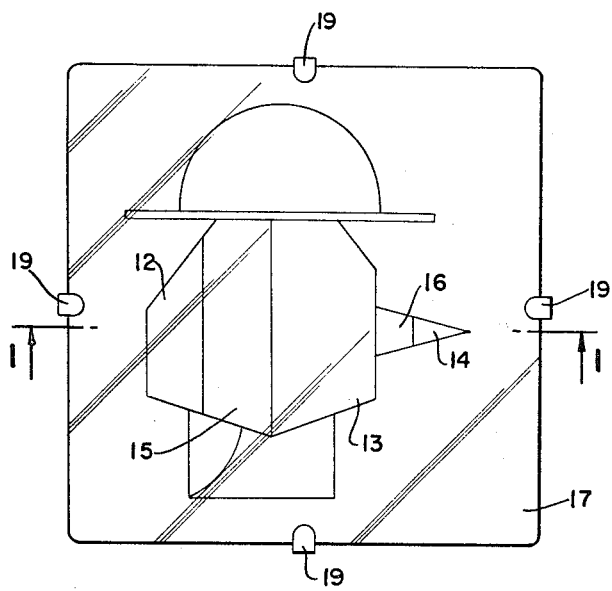
FIG.2.
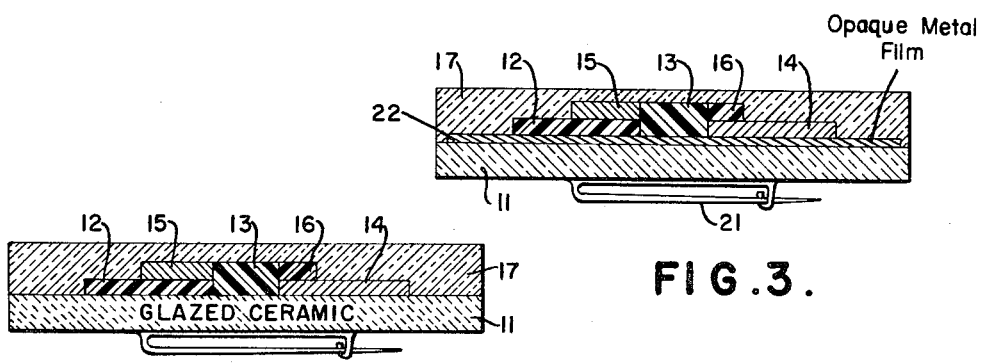
FIG.3.
FIG.4.
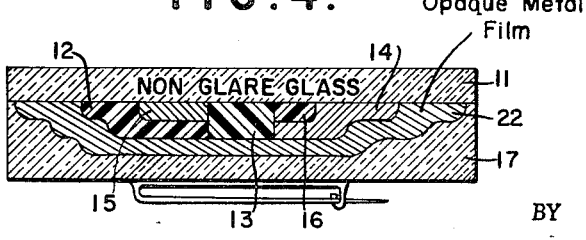
FIG.5.
*INVENTORS*
Charles Feldman &
Estelle H. Feldman
BY Allan M. Lowe
*ATTORNEY*

United States Patent Office 3,412,575
Patented Nov. 26, 1968

3,412,575
JEWELRY ARTICLE INCLUDING THIN METAL AND DIELECTRIC FILMS
Charles Feldman and Estelle H. Feldman, both of 7400 Rebecca Drive, Alexandria, Va. 22307
Filed Jan. 18, 1966, Ser. No. 521,374
19 Claims. (Cl. 63—2)

ABSTRACT OF THE DISCLOSURE

An article of jewelry includes a substrate on which are deposited thin films of dielectric, metal and semiconductor materials, arranged in a predetermined aesthetically pleasing pattern. The substrate forms one protective layer, while a second protective layer is comprised of a plastic coating. The pattern may be viewed either through the substrate or plastic coating. In one embodiment, the substrate is a glazed ceramic and in another embodiment, nonglare glass. In each embodiment light opaque means is provided on one of the protective layers to reflect light to a viewer. A jewelry mount is secured to one of the layers.

---

The present invention relates generally to articles of jewelry and more particularly to jewelry articles fabricated from thin films of metals and dielectrics.

It is known that the electric and optical properties of materials are related to each other. In particular, all metallic conductors having thicknesses in excess of $1/10$ of a wavelength of visible light are reflectors and provide relatively bright and shiny appearances to a viewer. Thin films of dielectrics, however, i.e., those having thicknesses between $1/10$ of a wavelength to several wavelengths of visible light, may be either reflective or nonreflective to light energy, depending upon the film thickness as a function of wavelength.

Conductive metals are reflective because they include a relatively large number of free electrons which prevent the transmission of light energy to the surface thereof remote from an optical source. In contrast, dielectrics include relatively few free electrons, whereby light energy is reflected from the surface proximate a light source and the surface removed from the light source. Depending upon the thickness of the dielectric film, the light waves reflected from the two surfaces thereof either constructively or destructively interfere with each other. Semiconductive thin films, i.e. films including numbers of free electrons between the dielectrics and metals, may function similarly to either metals or dielectrics, depending upon the number of free electrons.

Thin dielectric films provide constructive interference to reflect light in accordance with:

$$N\lambda = 2nd \cos \theta \quad (1)$$

where:
$\lambda$ = wavelength of the light reflected from the film;
$N$ = a positive integer if the film is mounted on a metal reflecting layer or a substrate having an index of refraction greater than the film; but N is a positive integer plus one-half, i.e. $m+1/2$, if the film is mounted on a substrate having an index of refraction less than the film;
$n$ = index of refraction of the film;
$d$ = thickness of the film; and
$\theta$ = angle of incidence of the light impinging on the film, i.e. deviation of the light beam from the normal to the film surface.

If white light impinges on such a film at a predetermined angle, Equation 1 indicates what wavelength, hence color is reflected from the film. As the angle of the light impinging on the dielectric film changes, the colors reflected from the film vary to provide pleasing aesthetic effects. If N is of minimum value, $\theta=0$, $n$ is sufficiently large, and the film has a highly reflective backing, very bright or intense and beautiful colors can be obtained. The wavelengths reflected from the films, hence the bright colors observed in response to light impinging on the films when the angle of incidence is approximately zero, can be controlled merely by changing the thickness of the films.

According to the present invention, advantage is taken of the pleasing visual effects of thin metal and dielectric films to provide articles of jewelry. The films are deposited on a dielectric substrate in a predetermined abstract or realistic pattern by utilizing standard vacuum vapor deposition techniques. Thin film semiconductors, e.g. cadmium sulfide or cadmium selenide, may also be employed to provide yellow and red tints. The substrate, preferably a ceramic or glass, is provided with an opaque backing or is coated with a shiny, colorless metal film to provide reflection for all light in the visible region. To provide brilliant red, green and/or blue pattern segments respectively resembling the colors of ruby, emerald and sapphire, a dielectric material having a high index of refraction, such as zinc sulfide ($n=2.4$), is deposited to the required thicknesses on the substrate.

The brilliant silvery metallic effect of the reflecting backing can be modified by depositing gold or copper as an inlay between the dielectric films. In addition, an optically transparent film (i.e. a film with a thickness on the order of 50 to 100 angstroms) of gold or copper can be deposited on the dielectric films to provide tinted green effects with the colors reflected from the dielectric.

In certain instances, where it is sought to provide dull reflected colors from the dielectric films, the films have thicknesses which correspond with integral multiple values of N in Equation 1, i.e. N in Equation 1 is greater than 1. Brilliance of the reflected colors can also be reduced by utilizing dielectric materials having relatively low indicies of refraction, such materials being magnesium fluoride or silicon dioxide, which respectively have values of $n=1.3$ and 1.5. Such dielectrics, however, must have indices of refraction greater than the substrate on which the film is deposited to achieve reflection of the colors desired.

In forming the jewelry articles of the present invention, a single substrate is divided into a multiplicity of segments. On each segment, the desired patterns of dielectric and metal films are formed utilizing conventional masking techniques well known to those skilled in the vacuum vapor deposition art. Subsequent to deposition of the films, the substrate is diced into said segments and a transparent plastic protective coating is formed on the exposed surfaces of the substrate and the films.

The protective coating, which preferably is a plastic such as polyurethane epoxy, has a thickness in the range of between 0.5 and 5 millimeters to prevent damage to the films due to fingernail scratches and the like. If a protective coating of sufficient thickness is not provided, the films, being extremely thin, can be destroyed or worn in response to mechanical wearing and scratching. Since film thickness is critical in obtaining the desired color effects, wearing of this film is intolerable if the aesthetic qualities of the article are to be preserved. The upper limit of the protective coating thickness must be maintained if the coating is to be sufficiently transparent to enable the aesthetic effects of the thin films to be viewed. Films thicker than 5 millimeters are apt to have air bubbles that destroy the transparent nature thereof. In addition, protective coatings having thicknesses in excess of the stated maximum are likely to be excessively heavy and bulky for jewelry attractive to the wearer and observer.

Subsequent to the deposition of the protective coating on the thin films, the diced articles are attached to a jewelry mount. The jewelry mount may take the form of a clothing clasp that is bonded either to the substrate backing or directly to the substrate. In addition, the mounting can be the prongs of a ring or earrings, the mount of a tie clasp, cuff links, etc.

According to one embodiment of the invention, the requirement for a bubble free, transparent protective coating is eliminated by reversing the film pattern and viewing the pattern through a transparent substrate.

The present invention, in addition to having the appearance of precious gems and metals, actually may incorporate small amounts of precious metals, for example gold, silver and platinum. The utilization of precious metals enhances the article as a piece of jewelry for consumer use. The amount of precious metal employed in forming the thin films is, however, so small that it does not add appreciably to the cost of manufacturing the article.

It is, accordingly, the object of the present invention to provide an article of jewelry fabricated in a predetermined pattern from thin films of metals, dielectrics and/or semiconductors.

Another object of the invention is to provide a relatively inexpensive article of jewelry that contains precious metals and thin films of dielectric materials to simulate the appearance of gems.

An additional object of the invention is to provide an article of jewelry fabricated from thin metal and dielectric films that are arranged to provide maximum brilliance of a plurality of colors and hence, pleasing aesthetic visual effects.

A further object of the invention is to provide, as an article of jewelry, a substrate on which is deposited thin metal and dielectric films having a protective, transparent coating thereon, which coating is of sufficient thickness to prevent mechanical wearing of films.

Yet another object of the invention is to provide an article of jewelry comprising thin films deposited in aesthetically pleasing patterns on a transparent substrate wherein the films are protected by a film that need not possess optical properties.

The above and still further objects, features and advantages of the present invention will become apparent upon consideration of the following detailed description of several specific embodiments thereof, especially when taken in conjunction with the accompanying drawings, wherein:

FIGURE 1, is a side sectional view of the jewelry article in accordance with one embodiment of the present invention;

FIGURE 2, is a top view of the article illustrated in FIGURE 1;

FIGURE 3, is a side sectional view of another embodiment of the present invention wherein the metallic backing employed in FIGURE 1 is replaced with a thin metal layer on the upper surface of the substrate;

FIGURE 4, is a side sectional view of another embodiment of the invention wherein the substrate is fabricated from a glazed ceramic material so that it is reflecting; and FIGURE 5 is a side sectional view of another embodiment of the invention wherein a jewelry clasp is mounted on a protective layer.

Reference is now made to FIGURES 1 and 2 of the drawings wherein optically transparent glass or ceramic dielectric substrate 11, having a thickness on the order of one-eighth inch, is illustrated. On one side of substrate 11, are deposited, by vacuum vapor deposition techniques utilizing masks for controlling the region of deposition ornamental means including, dielectric thin films 12 and 13 of a material having an index of refraction greater than that of the substrate. Thin films 12 and 13 must have indices of refraction greater than the index of refraction of substrate 11 so that they, rather than the substrate, will serve as the primary dielectric reflectors. Deposited on substrate 11, by the same method as utilized for depositing films 12 and 13, is further ornamental means including thin metal film 14. On films 12 and 14 are respectively vacuum vapor deposited thin metal and dielectric films 15 and 16; the former having a thickness in the range of between 50 and 100 angstroms so that it is optically transparent.

Of course, it is to be understood that the thin films illustrated are shown as having thicknesses disproportionate to their actual thickness, in order to illustrate them clearly.

Films 12–16 are deposited in a predetermined pattern, such as a harlequin, as illustrated in FIGURE 2. Precisely defined patterns for each of the films, to provide the desired aesthetic relationship, are obtained by utilizing masks formed from photographic techniques. Intricate scrolls and the like can be deposited by cutting or etching appropriate patterns in thin metal or plastic masks under the control of photographic plates. The various metal and dielectric segments of the harlequin are formed of films having thicknesses selected to give aesthetically pleasing color effects. The color effects are variable depending upon the angle of incidence of white light impinging on the face of the article. This variable effect is pleasing to the eye and puzzling and attractive to the observer. In normal use, when white light generally impinges on the article with an angle of incidence at right angles to the article face, the reflected light can be very intense.

To provide intense colors in response to white light impinging on the article at right angles thereto, layers 12 and 16 consist of zinc sulfide, a dielectric having an index of refraction of approximately 2.4. The thickness of layer 12, to provide the described brilliance, is selected in accordance with Equation 1, where $N=\frac{1}{2}$. N is selected to equal one-half because this value enables the films to have minimum thicknesses, whereby internal reflections are minimized and maximum amount of reflected light is derived. Since appreciable white light normally impinges on layer 12 at right angles to the film surface, intense blue, green and red colors are derived by forming the layer so its thicknesses are approximately 480 angstroms, 540 angstroms and 670 angstroms, respectively.

The nose segment of the harlequin, coincident with dielectric layer 16, having a thickness of approximately 1480 angstroms, is provided with an intense red color by locating colorless optically opaque reflecting metal layer 14 beneath the dielectric layer. The greater thickness for layer 16 compared to layer 12 for the same color results from differences in the phase of light reflected from metal film 14 and substrate 11. Despite being thicker, greater light is reflected from layer 16 because its underneath metal layer has far superior reflecting properties than transparent dielectric substrate 11. To provide bright blue and green colors from film 16, the film has thicknesses of 1050 angstroms and 1180 angstroms, respectively. Layer 14 has a thickness in excess of 500 angstroms to achieve the opaque and reflecting properties desired. It is preferably selected from the group consisting of silver, platinum, nickel, chromium, aluminum and cobalt. Of these metals, platinum is most preferable because it does not oxidize, hence is an excellent shiny reflector; platinum is also preferred because of its excellent adhering qualities to substrate 11 by vacuum vapor deposition techniques. The metals specified cause the tip of the harlequin's nose to have a shiny silvery appearance in the region where film 14 is not covered by layer 16.

If it is desired to provide the red light reflected from dielectric 16 with a yellow tint and have the harlequin's nose appear to be gold, film 14 can be fabricated from gold or copper. As with the case for the colorless metals, a gold or copper layer for film 14 must have a thickness in excess of approximately 500 angstroms to be opaque and reflecting. In the event that layer 14 is gold or copper, an undercoating thin film layer of chromium must be deposited on substrate 11 prior to deposition of the gold or copper layer. The chromium layer is employed because gold and copper do not adhere particularly well to the glass or ceramic substrate. The chromium layer need only be of sufficient thickness to enable the gold or copper film to stick to it, i.e. 200 angstroms or more. To enable the rear head segment of the harlequin to be an intense blue, the portion of layer 12 not covered by film 15 is formed of zinc sulfide that is deposited to a thickness to approximately 480 angstroms. The bright blue color of layer 12 is modified with a greenish tint toward the center of the harlequin's head by covering it with gold layer 15, having a thickness in the range of between 50 and 100 angstroms so that it is optically transparent. Thereby, white light is transmitted through layer 15, blue light is reflected from layer 12 and passes back through nonopaque film 15. Some of the light in the green spectrum that originally impinged on gold film 15 is reflected from that film to provide the green tint specified.

The forward section of the harlequin's head, coincident with layer 13, is a dull green color. The dull green color is obtained by utilizing a dielectric having a low index of refraction, such as magnesium fluoride ($n=1.3$), and depositing the magnesium fluoride on substrate 11 to a thickness such that N in Equation 1 has a value greater than unity. The thicker film employed for layer 13, resulting from N being greater than one and the index of refraction for magnesium fluoride being less than that for zinc sulfide, causes increased internal reflection within the film to reduce the brilliancy of the reflected light. In a typical arrangement where magnesium fluoride is employed as layer 13, and $N=5/2$, the layer has a thickness of approximately 5000 angstroms to obtain the dull green color.

While zinc sulfide is preferred as a material for dielectric layers 12, 13, and 16 because of its high index of refraction, it is to be understood that any colorless dielectrics having an index of refraction greater than the index of refraction for substrate 11 can be deposited on the substrate to achieve the desired results. We have found that calcium fluoride and silicon dioxide, in addition to the aforementioned zinc sulfide and magnesium fluoride dielectrics, meet the stated requirements. If a slight straw tint is sought in the reflected color from the dielectric, any one or all of layers 12, 13 and 16 may be formed of silicon monoxide, a dielectric that is not completely colorless but adds a slight straw tint to the light reflected from it. Similarly, if layers 12, 13 and 16 are the semiconductors cadmium sulfide or cadmium selenide, yellow and red tints, respectively, are added to the reflected light.

After a plurality of patterns as illustrated are simultaneously formed on a single substrate utilizing vacuum vapor deposition techniques, the substrate is cut into a plurality of separate chips that may be of any desired shape, for example rectangular, triangular, circular or elliptical. The upper surface of each chip, that is, the exposed substrate and thin film segments, then has bonded to it a protective coating 17 of a transparent, dielectric plastic material, such as an epoxy of polyurethane. Since none of the thin films of substrate 11 extend to the edge of the substrate, each of them is completely covered by the protective coating, leaving no exposed edges.

Coating 17 has a thickness in the range of 0.5 to 5 millimeters to prevent mechanical wear and scratching of the thin films. The coating must not exceed the maximum thickness stated if it is to be transparent and enable the pleasing effects of the thin film pattern to be appreciated to the utmost. Coating 17 must have a thickness commensurate with the minimum stated if damage due to fingernails, scraping of the article against foreign objects, and the like is to be obviated. Because films 12–16 are so thin, any scratch on them will remove an appreciable portion of the deposited material and destroy the desired optical effects. The protection afforded by coating 17 to films 12–16 can be augmented or replaced with a thin glass layer that is bonded to the upper surface of the pattern or mechanically held in place by prongs 19. Because films 12–16 are so thin, e.g. they can not be felt with a human hand, a planar sheet of glass suffices as a protective layer immediately covering the pattern.

Of course, substrate 11 serves as a protective layer for the back of the thin films, i.e. the side that is not seen in FIGURE 2.

Once protective coating 17 has been bonded in situ, the article is placed in a jewelry mount; illustrated in FIGURES 1 and 2 as metal pin mount 18 having prongs 19 that extend vertically along the sides of substrate 11 and coating 17 to the surface of the coating. The entire bottom surface of substrate 11, as viewed in the drawings, is bonded to the interior planar surface of mount 18 by a transparent, epoxy glue. Hence, mount 18 serves as an opaque, shiny backing for transparent substrate 11 to increase the brilliance of the light reflected from thin films 12 and 13 by reflecting light back through the outer face of layer 17 that is transmitted through layers 11 and 17 to a region beyond the back of the pattern comprising layers 12–16. In particular, mount 18 reflects light originally directed through the exposed or outer face of layer 17 that is propagated through layers 17 and 11 to the regions beyond the pattern comprising layers 12–16 back through layers 11 and 17 to the exposed face of layer 17.

Bonded by soldering or epoxy glue to the rear of mount 18, the side of the mount removed from substrate 11, is a suitable jewelry clasp 21 so that the article can be worn as a scatter pin or the like. If the jewelry article is to serve as decoration for a jewelry mounting such as a tie clasp, ring or cuff link, it is frequently desirable to exclude prongs 19 and bond substrate 11 to mount 18.

In FIGURE 3, metal backing surface 18 is eliminated and its function replaced with thin film 22 of a metal having a silvery appearance. Layer 22 almost completely covers the upper planar surface of glass or ceramic substrate 11 and is deposited to a thickness in excess of 500 angstroms so it is opaque and reflecting. In actuality, however, layer 22 is set back from the edges of substrate 11 by approximately 0.5 millimeters so that it can be covered by protective coating 17 and not exposed to mechanical wear. The 0.5 millimeter set back is so small that the slight degree of transparency introduced thereby is not seen except by the most careful observers.

On layer 22 are deposited suitable additional dielectric and metal layers in a desired pattern, as illustrated in FIGURES 1 and 2, to provide the asthetically pleasing colors and design sought. Since dielectric layers 12 and 13 are formed immediately above metal layer 22, the values of N in Equation 1 are integral.

Because reflecting layer 22 is provided on the upper face of substrate 11, there is no need for a reflecting backing member. In consequence, the jewelry mounting, such as clasp 21, can be attached directly to the rear of substrate 11 by epoxy glue.

According to a further embodiment of the invention, illustrated in FIGURE 4, the transparent ceramic or glass substrate is replaced with a glazed ceramic substrate that is opaque and reflecting. With such a configuration, there is no need for thin film metal layer 22, as shown in FIGURE 3, nor of metal backing 18, FIGURE 1. Instead, the thin film pattern of dielectrics and metals is formed directly on the upper substrate surface and the jewelry mounting or clasp 21 is bonded on the rear surface of the substrate by epoxy glue.

A further embodiment of the invention is illustrated in FIGURE 5 wherein substrate 11 is a non-glare glass. The pattern formed by layers 12–16 is formed in reverse, relative to the pattern of FIGURE 1. Because substrate 11 is transparent and the pattern is formed in reverse, the same effect as derived with the pin of FIGURE 1 is obtained with the article of FIGURE 5 by viewing the pattern through the substrate. Thin film, opaque metal layer 22 is deposited on the pattern to provide a reflecting surface for hiding protective coating 17 that is bonded by epoxy glue to layer 22. Clasp 21 is glued to the exposed face of coating 17, rather than substrate 11, whereby a complete reversal of the structure shown in FIGURE 1 is attained.

The construction of FIGURE 5 enables less expensive manufacturing techniques and materials to be utilized in conjunction with protective film 17. Film 17 need not be transparent nor must it be free of bubbles since it is not on the exposed, viewed side of the article. In addition, the function of reflective layer 16 is replaced by layer 22, thereby eliminating a step in cost and time of manufacture.

While we have described and illustrated several specific embodiments of our invention, it is clear that variations of the details of construction which are specifically illustrated and described may be made without departing from the true spirit and scope of the invention as defined in the appended claims. For example, substrate 11 and protective coating 17 are not necessarily clear but can be provided with a dye to provide a slight tint to the entire article. Also, substrate 11 is not necessarily planar but can be curved in a circular, elliptical or irregular manner to enhance the appeal of the article.

We claim:

1. An article of jewelry comprising a pair of stacked dielectric potective layers having ornamental means including a pattern of metal and dielectric thin films sandwiched between them whereby each of said layers has an outer face and an interior face, a first of said layers being transparent to enable light to be propagated through it to said pattern and to enable light reflected from said pattern to be propagated to the outer face of said first layer, said thin films being deposited on the interior face of one of said layers in a pattern to provide an aesthetically pleasing design when viewed from the outer face of said first layer, said dielectric films having thicknesses to selectively provide constructive interference of predetermined wavelengths of visible light resulting from reflections from the surfaces of the dielectric films proximate and remote from the outer face of said first layer and thereby provide colored segments to said pattern, certain of said metal films being of sufficient thicknesses to be reflective and opaque to all wavelengths in the visible light spectrum, said protective layers being of sufficient thicknesses to prevent scratching of the films in response to mechanical wear, and a jewelry mount bonded to one of said layers.

2. The article of claim 1 wherein said pattern includes a film of gold overlaying a portion of said dielectric films as viewed from the outer face of said first layer, said gold film having a thickness in the range between 50 and 100 angstroms so it is transparent and provides a green tint to the light reflected from the dielectric film on which it overlays.

3. The article of claim 1 wherein at least one of said dielectric films consists of zinc sulfide.

4. The article of claim 1 wherein said metals are selected from the group consisting of chromium, nickel, aluminum, platinum, gold, cobalt, silver and copper.

5. The article of claim 1 wherein said dielectrics are selected from the group consisting of zinc sulfide, silicon monoxide, magnesium fluoride, calcium fluoride and silicon oxide.

6. The article of claim 1 wherein a further thin dielectric film overlays at least one of said metal films as viewed from the outer face of said first layer, said further dielectric film having a thickness to reflect a predetermined wavelength of visible light.

7. The article of claim 1 wherein said second protective layer comprises a glazed ceramic dielectric substrate carrying said thin films.

8. The article of claim 2 further including light opaque means on one of said layers for reflecting light directed through the outer face of said first layer to a region beyond the pattern back to the outer face of said first layer.

9. The article of claim 8 wherein both of said layers are transparent and said light opaque means comprises a metal, opaque backing reflective to all light in the visible spectrum, said backing being bonded by a transparent medium, to the outer face of said second layer.

10. The article of claim 8 wherein said second protective layer and said light opaque means are together comprised of a glazed ceramic dielectric substrate carrying said thin films.

11. The article of claim 8 wherein said first protective layer comprises a transparent dielectric substrate carrying said films.

12. The article of claim 1 wherein said first protective layer is plastic and has a thickness in the range of from 0.5 to 5 millimeters.

13. The articles of claim 1 wherein said pattern includes thin film semiconductor layers.

14. The article of claim 13 wherein said semiconductor layers are selected from the group consisting of cadmium sulfide and cadmium selenide.

15. The article of claim 1 wherein said second layer is a substrate carrying said thin films.

16. The article of claim 1 wherein said first layer is a substrate on which said thin films are deposited.

17. The article of claim 1 wherein said first protective layer comprises a transparent dielectric substrate on which said thin films are deposited.

18. The article of claim 1 wherein said first layer is tinted with a predetermined color.

19. The article of claim 1 further including a thin film of colorless opaque reflecting metal deposited on a face of one of said layers other than the outer face of said first layer to provide visible light reflection, said pattern of metal and dielectric films being carried by said colorless metal thin film layer.

References Cited

UNITED STATES PATENTS

| | | | |
|---|---|---|---|
| 227,377 | 5/1880 | Meyer | 63—32 X |
| 2,143,084 | 1/1939 | Nirenstein | 63—32 |
| 2,181,926 | 12/1939 | Tiger | 63—32 |
| 2,350,421 | 6/1944 | Schoder et al. | 63—32 X |
| 2,535,807 | 12/1950 | Moyd | 63—32 |
| 2,778,208 | 1/1957 | Flint | 63—23 |
| 2,999,034 | 9/1961 | Heidenhain | 117—45 X |
| 3,338,730 | 8/1967 | Slade et al. | 350—164 |

F. BARRY SHAY, *Primary Examiner.*